US010071649B2

(12) United States Patent
Matsubara et al.

(10) Patent No.: US 10,071,649 B2
(45) Date of Patent: Sep. 11, 2018

(54) METHOD FOR CONTROLLING EXTERNAL ELECTRIC POWER SUPPLY SYSTEM OF FUEL CELL-MOUNTED VEHICLE, AND EXTERNAL ELECTRIC POWER SUPPLY SYSTEM

(71) Applicant: TOYOTA JIDOSHA KABUSHIKI KAISHA, Toyota-shi, Aichi-ken (JP)

(72) Inventors: Yasuo Matsubara, Anjo (JP); Kenji Umayahara, Miyoshi (JP); Keigo Suematsu, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 277 days.

(21) Appl. No.: 14/939,401

(22) Filed: Nov. 12, 2015

(65) Prior Publication Data

US 2016/0137065 A1    May 19, 2016

(30) Foreign Application Priority Data

Nov. 13, 2014  (JP) ................................ 2014-231005

(51) Int. Cl.
*B60L 1/00* (2006.01)
*B60L 11/18* (2006.01)

(52) U.S. Cl.
CPC .......... *B60L 11/1862* (2013.01); *B60L 1/006* (2013.01); *B60L 11/1842* (2013.01); *B60L 11/1887* (2013.01); *B60L 2240/545* (2013.01); *Y02T 10/7005* (2013.01)

(58) Field of Classification Search
CPC .... B60L 1/00; B60L 11/1881; B60L 11/1862; Y02T 10/7005
See application file for complete search history.

(56) References Cited

U.S. PATENT DOCUMENTS 9,193,273 B1 * 11/2015 Frank .................. B60L 11/1814
2007/0190369 A1  8/2007 Leach et al.
(Continued)

FOREIGN PATENT DOCUMENTS

CN       101665110        3/2010
CN       102341286 A      2/2012
(Continued)

*Primary Examiner* — Jared Fureman
*Assistant Examiner* — Emmanuel R Dominique
(74) *Attorney, Agent, or Firm* — Finnegan, Henderson, Farabow, Garrett & Dunner, LLP

(57) ABSTRACT

A method for controlling an external electric power supply system supplying electric power from a fuel cell and a secondary battery mounted on a vehicle to an external load, the method including controlling electric power from the fuel cell and the secondary battery such that externally supplied electric power supplied to the external load is equal to or less than supply allowed electric power, and setting the supply allowed electric power to be equal to or less than a smaller one of an upper limit value of electric power which the secondary battery is charged with set in accordance with a temperature, and an electric power storage amount of the secondary battery and an upper limit value of electric power discharged from the secondary battery set in accordance with the temperature and the electric power storage amount of the secondary battery.

5 Claims, 3 Drawing Sheets

(56) References Cited

U.S. PATENT DOCUMENTS

| | | | |
|---|---|---|---|
| 2009/0174369 A1* | 7/2009 | Kawahara | B60L 11/1864 |
| | | | 320/150 |
| 2009/0254234 A1 | 10/2009 | Noguchi et al. | |
| 2010/0063704 A1 | 3/2010 | Okubo et al. | |
| 2011/0320082 A1 | 12/2011 | Ishishita | |
| 2012/0021257 A1 | 1/2012 | Yoshida et al. | |
| 2012/0187753 A1 | 7/2012 | Schaffnit | |
| 2012/0212174 A1 | 8/2012 | Ishikawa et al. | |
| 2014/0303821 A1 | 10/2014 | Oda | |
| 2016/0068074 A1* | 3/2016 | Frank | B60L 11/1814 |
| | | | 701/22 |

FOREIGN PATENT DOCUMENTS

| | | |
|---|---|---|
| CN | 103889777 A | 6/2014 |
| DE | 11 2010 001 900 T5 | 6/2012 |
| JP | 2003-023706 | 1/2003 |
| JP | 2009-254145 | 10/2009 |
| JP | 2010-041828 A | 2/2010 |
| JP | 2010-176864 A | 8/2010 |
| JP | 2012-034554 | 2/2012 |
| JP | 2013-31348 A | 2/2013 |
| JP | 2013-93941 | 5/2013 |
| JP | 2013-198292 | 9/2013 |
| JP | 2014-075853 | 4/2014 |
| WO | WO 2010/100748 A1 | 9/2010 |

\* cited by examiner

METHOD FOR CONTROLLING EXTERNAL ELECTRIC POWER SUPPLY SYSTEM OF FUEL CELL-MOUNTED VEHICLE, AND EXTERNAL ELECTRIC POWER SUPPLY SYSTEM

INCORPORATION BY REFERENCE

The disclosure of Japanese Patent Application No. 2014-231005 filed on Nov. 13, 2014 including the specification, drawings and abstract is incorporated herein by reference in its entirety.

BACKGROUND OF THE INVENTION

1. Field of the Invention

The invention relates to an external electric power supply system that supplies electric power to the outside by using a fuel cell and a secondary battery mounted on a vehicle.

2. Description of Related Art

An external electric power supply system that supplies electric power to an external load of a vehicle by using a fuel cell and a secondary battery mounted on the vehicle has been known (Japanese Patent Application Publication No. 2013-198292 (JP 2013-198292 A), Japanese Patent Application Publication No. 2013-93941 (JP 2013-93941 A)).

In the fuel cell, an increase or decrease in generated electric power is delayed with respect to an increase or decrease in externally supplied electric power that is required due to a delayed reaction of an air compressor attributable to inertia or the like, and thus electric power supply to the external load cannot be stable. In JP 2013-198292 A, external electric power supply is performed based solely on output electric power of the secondary battery and nothing is described with regard to the above problem.

SUMMARY OF THE INVENTION (1) According to a first aspect of the invention, there is provided a method for controlling an external electric power supply system supplying electric power from a fuel cell and a secondary battery mounted on a vehicle to an external load, the method including controlling electric power generation of the fuel cell and charging and discharging of the secondary battery such that externally supplied electric power as electric power supplied to the external load from the fuel cell and the secondary battery is equal to or less than supply allowed electric power, and setting a value of the supply allowed electric power to be equal to or less than a smaller one of i) an upper limit value of electric power which the secondary battery is charged with set in accordance with a temperature and an electric power storage amount of the secondary battery and ii) an upper limit value of electric power discharged from the secondary battery set in accordance with the temperature and the electric power storage amount of the secondary battery. According to this configuration, a shortfall of generated electric power can be sufficiently compensated for by the electric power discharged from the secondary battery even when the externally supplied electric power that is required rapidly increases. In addition, the secondary battery can be sufficiently charged with a surplus of the generated electric power even in a case where the externally supplied electric power that is required rapidly decreases to zero when the externally supplied electric power is generated entirely by the fuel cell. Accordingly, electric power supply to the external load can be stable even when an increase or decrease in the electric power generated by the fuel cell is delayed with respect to an increase or decrease in the externally supplied electric power that is required.

(2) In the method according to the aspect described above, the value of the supply allowed electric power may be set to be equal to or less than a smallest one of i) the upper limit value of the electric power which the secondary battery is charged with, ii) the upper limit value of the electric power discharged from the secondary battery, and iii) an output limit value of the electric power generated by the fuel cell when the fuel cell is in a state where the fuel cell is capable of supplying the generated electric power to the external load. According to this configuration, the externally supplied electric power that is required can be generated entirely by the fuel cell even when the externally supplied electric power that is required rapidly increases. Accordingly, it is possible to inhibit the electric power storage amount of the secondary battery from lowering with the fuel cell not capable of sufficiently generating the externally supplied electric power that is required and electric power supplied from the secondary battery. In addition, it is possible to inhibit a reduction in the actual externally supplied electric power attributable to a reduction in the electric power storage amount of the secondary battery.

(3) In the method according to the aspect described above, the value of the supply allowed electric power may be set to be equal to or less than a smallest one of i) the upper limit value of the electric power which the secondary battery is charged with, ii) the upper limit value of the electric power discharged from the secondary battery, and iv) an upper limit value of the supply allowed electric power at which a magnitude of electric power passing through an electric power conversion unit converting electric power generated by the fuel cell into the externally supplied electric power is equal to or less than an upper limit value set such that the electric power conversion unit is protected. According to this configuration, damage to the electric power conversion unit can be inhibited even when the externally supplied electric power that is required increases.

(4) In the method according to the aspect described above, the value of the supply allowed electric power may be set to be equal to or less than a smallest one of i) the upper limit value of the electric power which the secondary battery is charged with, ii) the upper limit value of the electric power discharged from the secondary battery, iii) the output limit value of the electric power generated by the fuel cell, and iv) an upper limit value of the supply allowed electric power at which a magnitude of electric power passing through an electric power conversion unit converting the electric power generated by the fuel cell into the externally supplied electric power is equal to or less than an upper limit value set such that the electric power conversion unit is protected when the fuel cell is in a state where the fuel cell is capable of supplying the generated electric power to the external load. According to this configuration, the externally supplied electric power that is required can be generated entirely by the fuel cell even when the externally supplied electric power that is required rapidly increases, and a reduction in the electric power storage amount of the secondary battery can be inhibited. In addition, damage to the electric power conversion unit can be inhibited.

(5) According to a second aspect of the invention, there is provided an external electric power supply system supplying electric power from a fuel cell and a secondary battery mounted on a vehicle to an external load, the external electric power supply system including a control device controlling electric power generation of the fuel cell and charging and discharging of the secondary battery such that externally supplied electric power as electric power supplied to the external load from the fuel cell and the secondary battery is equal to or less than supply allowed electric power, in which the control device sets a value of the supply allowed electric power to be equal to or less than a smaller one of an upper limit value of electric power which the secondary battery is charged with set in accordance with a temperature and an electric power storage amount of the secondary battery, and an upper limit value of electric power discharged from the secondary battery set in accordance with the temperature and the electric power storage amount of the secondary battery. According to this configuration, a shortfall of generated electric power can be sufficiently compensated for by the electric power discharged from the secondary battery even when the externally supplied electric power that is required rapidly increases. In addition, the secondary battery can be sufficiently charged with a surplus of the generated electric power even in a case where the externally supplied electric power that is required rapidly decreases to zero when the externally supplied electric power is generated entirely by the fuel cell. Accordingly, electric power supply to the external load can be stable.

The invention can be realized in various aspects. For example, the invention can be realized in the form of a vehicle on which a fuel cell and a secondary battery are mounted, an external electric power supply method for a vehicle, a control device that executes this method, a computer program that realizes this control method, a recording medium on which this computer program is recorded, or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A. First Embodiment

Figure 1:
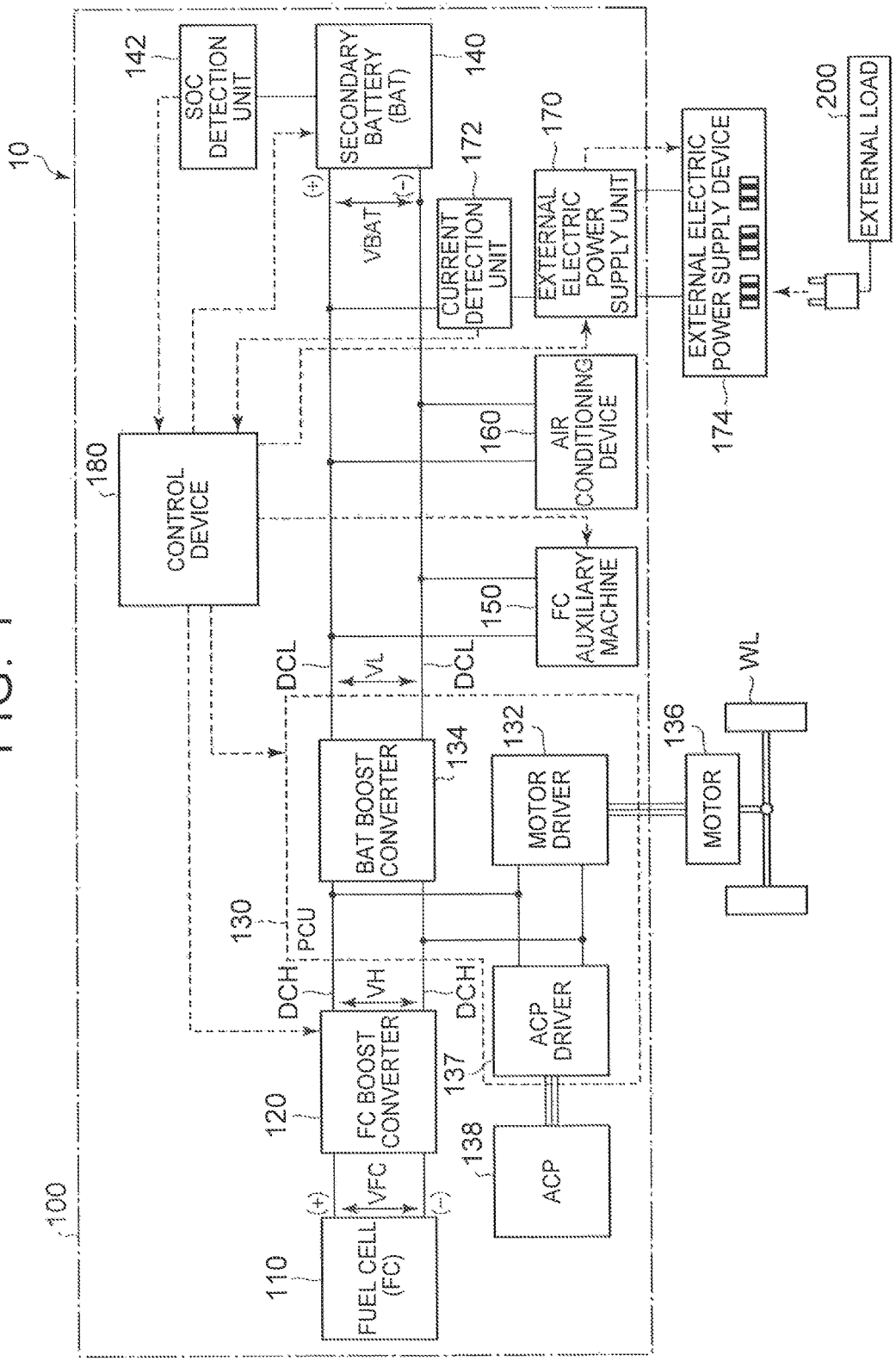
FIG. 1 is a schematic drawing illustrating the configuration of a fuel cell vehicle including an external electric power supply system.

FIG. 1 is a schematic drawing illustrating the configuration of a fuel cell vehicle 10 including an external electric power supply system 100 according to a first embodiment. The fuel cell vehicle 10 is provided with a fuel cell 110, an FC boost converter 120, a power control unit (PCU) 130, a traction motor 136, an air compressor (ACP) 138, a secondary battery 140, an SOC detection unit 142, an FC auxiliary machine 150, an air conditioning device 160, an external electric power supply unit 170, a current detection unit 172, a control device 180, and vehicle wheels WL. The fuel cell vehicle 10 travels when the traction motor 136 is driven by electric power that is supplied from the fuel cell 110 and the secondary battery 140. The fuel cell vehicle 10 according to this embodiment functions also as the external electric power supply system 100 and can supply electric power to an external load 200 while the fuel cell vehicle 10 is stopped.

"While the fuel cell vehicle 10 is stopped" according to this specification means a state where no electric power is supplied with respect to the driving of the traction motor 136 (described later) from the fuel cell 110 and the secondary battery 140 and does not include a so-called idling state, which is a state where acceleration is initiated based on an accelerator operation and a shift change. This state also includes a state where a movement of the fuel cell vehicle 10 is limited in a fixed manner by a braking mechanism such as a parking brake (so-called side brake). The "traveling of the fuel cell vehicle 10" means a state where the traction motor 136 is driven by the use of electric power of at least one of the fuel cell 110 and the secondary battery 140. This state also includes the idling state (excluding a state where the movement is limited in a fixed manner by the braking mechanism such as the parking brake).

The fuel cell 110 is a solid polymer-type fuel cell that generates electric power by receiving the supply of hydrogen and oxygen as reaction gases. The fuel cell 110 is not limited to the solid polymer-type fuel cell and various other types of fuel cells can be adopted as the fuel cell 110. The fuel cell 110 is connected to high-voltage direct-current wiring DCH via the FC boost converter 120 and is connected to a motor driver 132 and an ACP driver 137, which are included in the PCU 130, via the high-voltage direct-current wiring DCH. The FC boost converter 120 boosts an output voltage VFC of the fuel cell 110 to a high voltage VH that can be used by the motor driver 132 and the ACP driver 137.

A three-phase inverter circuit constitutes the motor driver 132. The motor driver 132 is connected to the traction motor 136. The motor driver 132 converts the output electric power of the fuel cell 110 that is supplied via the FC boost converter 120 and the output electric power of the secondary battery 140 that is supplied via a BAT boost converter 134 into three-phase alternating-current electric power and supplies the three-phase alternating-current electric power to the traction motor 136. A synchronous motor that is provided with a three-phase coil constitutes the traction motor 136. The traction motor 136 drives the vehicle wheels WL via a gear or the like. The traction motor 136 functions also as a generator that generates regenerative electric power by regenerating the kinetic energy of the fuel cell vehicle 10 during the braking of the fuel cell vehicle 10.

The BAT boost converter 134 adjusts the voltage level of the high-voltage direct-current wiring DCH in response to a driving signal from the control device 180 and switches charging/discharging states of the secondary battery 140. In a case where the regenerative electric power is generated in the traction motor 136, the regenerative electric power is converted into direct-current electric power by the motor driver 132 and the secondary battery 140 is charged therewith via the BAT boost converter 134.

A three-phase inverter circuit constitutes the ACP driver 137. The ACP driver 137 is connected to the ACP 138. The ACP driver 137 converts the output electric power of the fuel cell 110 that is supplied via the FC boost converter 120 and the output electric power of the secondary battery 140 that is supplied via the BAT boost converter 134 into three-phase alternating-current electric power and supplies the three-phase alternating-current electric power to the ACP 138. A synchronous motor that is provided with a three-phase coil constitutes the ACP 138. The ACP 138 drives a motor in response to the supplied electric power and supplies the fuel cell 110 with oxygen (air) used for electric power generation.

The secondary battery 140 is an electric power storage device that can store electric power energy and repeat charging and discharging. The secondary battery 140 can be configured as, for example, a lithium-ion battery. The secondary battery 140 may be another type of battery such as a lead storage battery, a nickel-cadmium battery, and a nickel metal hydride battery. The secondary battery 140 is connected to the BAT boost converter 134, which is included in the PCU 130, via low-voltage direct-current wiring DCL and is connected to the high-voltage direct-current wiring DCH via the BAT boost converter 134.

The SOC detection unit 142 detects the electric power storage amount (SOC) of the secondary battery 140 and transmits the result to the control device 180. The "electric power storage amount (SOC)" according to this specification means the remaining capacity-to-current charging capacity ratio of the secondary battery 140. The SOC detection unit 142 detects the temperature Tba, output voltage V, and output current I of the secondary battery 140 and detects the electric power storage amount (SOC) based on the detected values. The SOC detection unit 142 according to this embodiment transmits the temperature Tba of the secondary battery 140 to the control device 180 as well.

Each of the FC auxiliary machine 150, the air conditioning device 160, and the external electric power supply unit 170 is connected to the low-voltage direct-current wiring DCL and is driven by the electric power that is supplied from the fuel cell 110 and the secondary battery 140. The FC auxiliary machine 150 is auxiliary machinery for the electric power generation of the fuel cell 110 of a fuel pump that supplies the reaction gases to the fuel cell 110 and a refrigerant pump that supplies a refrigerant to the fuel cell 110 or the like. The air conditioning device 160 is air conditioning equipment such as an air conditioner.

The external electric power supply unit 170 is electric power supply equipment for electric power supply to an external load. The external electric power supply unit 170 is configured to be connectable to an external electric power supply device 174 that is used for the connection of the external load 200 which is operated based on alternating-current electric power. When the external electric power supply device 174 is connected to the external electric power supply unit 170, the fuel cell vehicle 10 functions as the external electric power supply system 100 and electric power is supplied from the fuel cell 110 and the secondary battery 140 to the external load 200 connected to the external electric power supply device 174. The external electric power supply unit 170 according to this embodiment supplies direct-current electric power from the low-voltage direct-current wiring DCL to the external electric power supply device 174, and the external electric power supply device 174 converts the direct-current electric power supplied from the external electric power supply unit 170 into 100 V AC electric power and supplies the electric power to an external load connected to an outlet for commercial electric power supply. The current detection unit 172 is disposed at wiring connecting the external electric power supply unit 170 and the low-voltage direct-current wiring DCL to each other. The current detection unit 172 measures the amount of the current that is supplied to the external electric power supply unit 170.

The control device 180 is configured as a microcomputer that is provided with a central processing device and a main memory device. The control device 180 switches drive modes of the fuel cell vehicle 10 when subjected to a driver's switching operation via a drive mode-switching switch (not illustrated). The fuel cell vehicle 10 according to this embodiment has a "normal traveling mode" and an "electric power supply mode" as the drive modes. The "normal traveling mode" is a mode for a traveling of the fuel cell vehicle 10 based on the driver's operation. When the normal traveling mode is selected and the driver's operation such as the accelerator operation is detected, the control device 180 controls the electric power generation of the fuel cell 110 and the charging and discharging of the secondary battery 140 in accordance with details of the operation. In the normal traveling mode, the control device 180 generates a driving signal depending on an accelerator depression amount $D_{ACC}$ and transmits the driving signal to each of the motor driver 132 and the BAT boost converter 134. The motor driver 132 allows the traction motor 136 to be driven to rotate in accordance with the accelerator depression amount $D_{ACC}$ by, for example, adjusting an alternating voltage pulse width in response to the driving signal from the control device 180.

The "electric power supply mode" is a mode in which the fuel cell vehicle 10 is allowed to function as the external electric power supply system 100 that supplies electric power to the external load 200 which is connected to the external electric power supply device 174 in a state where the fuel cell vehicle 10 is stopped. In a normal electric power supply mode, the control device 180 controls each portion of the external electric power supply system 100 for externally supplied electric power $P_{SUP}$ that is required to be supplied to the external load 200 based solely on the generated electric power $P_{FC}$ [W] generated by the fuel cell 110. In a case where the generated electric power $P_{FC}$ [W] falls short of the externally supplied electric power $P_{SUP}$ that is required, examples of which include a case where the fuel cell 110 is started, the control device 180 performs control for compensating for the shortfall with the electric power discharged from the secondary battery 140. In addition, the control device 180 sets supply allowed electric power $P_{ALW}$ as the upper limit value of the externally supplied electric power $P_{SUP}$ that is supplied to the external load 200 and controls the electric power generation of the fuel cell 110, the charging and discharging of the secondary battery 140, and the external electric power supply unit 170 so that the externally supplied electric power $P_{SUP}$ does not exceed the supply allowed electric power $P_{ALW}$. A method for calculating the supply allowed electric power $P_{ALW}$ will be described later.

In the electric power supply mode, the control device 180 calculates generation required electric power $P_{FCRQ}$ [W] by the following Equation (1). The control device 180 generates the generated electric power $P_{FC}$ by controlling the electric power generation of the fuel cell 110 based on the calculated generation required electric power $P_{FCRQ}$.

$$P_{FCRQ} = P_{ORQ} + P_{CRQ} + P_{ARQ} + P_{SOC} \quad (1)$$

Herein, $P_{ORQ}$ is electric power that is required for an operation of the external load 200 (externally required electric power) and corresponds to the externally supplied electric power $P_{SUP}$ described above. $P_{CRQ}$ is electric power that is required for operations of the ACP 138 and the FC auxiliary machine 150 (electric power required for the auxiliary machine). $P_{ARQ}$ is electric power that is required for an operation of the air conditioning device 160 (electric power required for air conditioning). $P_{SOC}$ is electric power that is used to allow the electric power storage amount (SOC) of the secondary battery 140 to approximate a target electric power storage amount (for example, 60%) (SOC-correcting electric power). The externally required electric power $P_{ORQ}$ can be calculated from the product of the current value I (measured value) measured by the current detection unit 172 and a low voltage VL. In a case where the calculated externally required electric power $P_{ORQ}$ exceeds the supply allowed electric power $P_{ALW}$ described above, the value of the supply allowed electric power $P_{ALW}$ is set to the value of the externally required electric power $P_{ORQ}$. The electric power required for the auxiliary machine $P_{CRQ}$ can be calculated from operation states of the ACP 138 and the FC auxiliary machine 150. The electric power required for air conditioning $P_{ARQ}$ can be calculated from the state of the air conditioning device 160. The SOC-correcting electric power $P_{SOC}$ can be calculated from the electric power storage amount (SOC) of the secondary battery 140 that is detected by the SOC detection unit 142.

Figure 2:
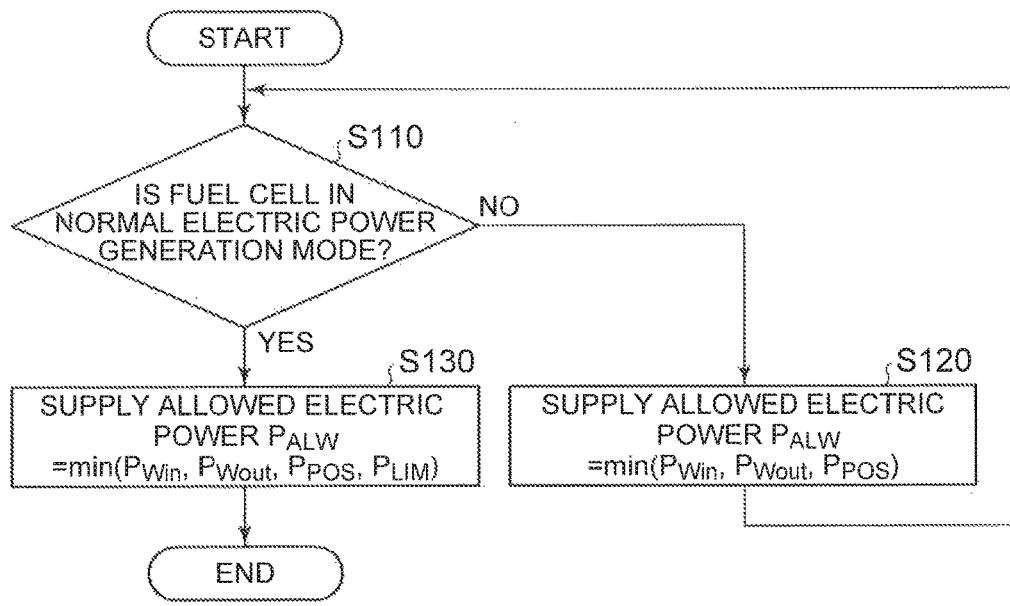
FIG. 2 is a flowchart for showing a calculation procedure regarding supply allowed electric power $P_{ALW}$.

FIG. 2 is a flowchart for showing a calculation procedure regarding the supply allowed electric power $P_{ALW}$. As the first step of the calculation of the supply allowed electric power $P_{ALW}$, the control device 180 determines whether or not the fuel cell 110 is in a normal electric power generation mode (Step S110). The "normal electric power generation mode" means a state where the fuel cell 110 can supply the generated electric power to the external load and excludes a case where the fuel cell 110 is "stopped", a "start preparation mode", and the like. The "start preparation mode" means a state where a preparatory operation for normal electric power generation is performed and includes a state where electric power generation is performed for warm-up during start below the freezing point, a state where an operation for the dilution of hydrogen present on a cathode side is performed during start, and the like. The generated electric power that is generated in the start preparation mode is not supplied to the external load 200.

In a case where the fuel cell 110 is not in the normal electric power generation mode, the control device 180 calculates the supply allowed electric power $P_{ALW}$ by the following Equation (2) (Step S120).

$$P_{ALW} = \min\{P_{Win}, P_{Wout}, P_{POS}\} \quad (2)$$

Herein, $P_{Win}$ is the upper limit value of the electric power with which the secondary battery 140 is charged, that is set in accordance with the temperature and the electric power storage amount (SOC) of the secondary battery 140 (charge allowed electric power). $P_{Wout}$ is the upper limit value of the electric power discharged from the secondary battery 140 that is set in accordance with the temperature and the electric power storage amount (SOC) of the secondary battery 140 (discharge allowed electric power). $P_{POS}$ is suppliable electric power that is set in order to protect components such as the BAT boost converter 134.

The charge allowed electric power $P_{Win}$ and the discharge allowed electric power $P_{Wout}$ can be calculated from the SOC charging and discharging characteristics and the temperature charging and discharging characteristics of the secondary battery 140. The "SOC charging and discharging characteristics" are a map in which the electric power storage amount (SOC) of the secondary battery 140 is associated with an allowed charging upper limit value $W_{in}$ of input (charging) electric power $P_{in}$ and an allowed discharging upper limit value $W_{out}$ of output (discharging) electric power $P_{out}$. The "temperature charging and discharging characteristics" are a map in which the temperature Tba of the secondary battery 140 is associated with the allowed charging upper limit value $W_{in}$ of the charging electric power and the allowed discharging upper limit value $W_{out}$ of the discharged electric power. The control device 180 can adopt, as $P_{Win}$, the smaller one of the allowed charging value $W_{in}$ specified from the electric power storage amount (SOC) acquired from the SOC detection unit 142 and the SOC charging and discharging characteristics and the allowed charging upper limit value $W_{in}$ specified from the temperature Tba acquired from the SOC detection unit 142 and the temperature charging and discharging characteristics. $P_{Wout}$ can be acquired by a similar method.

Figure 3:
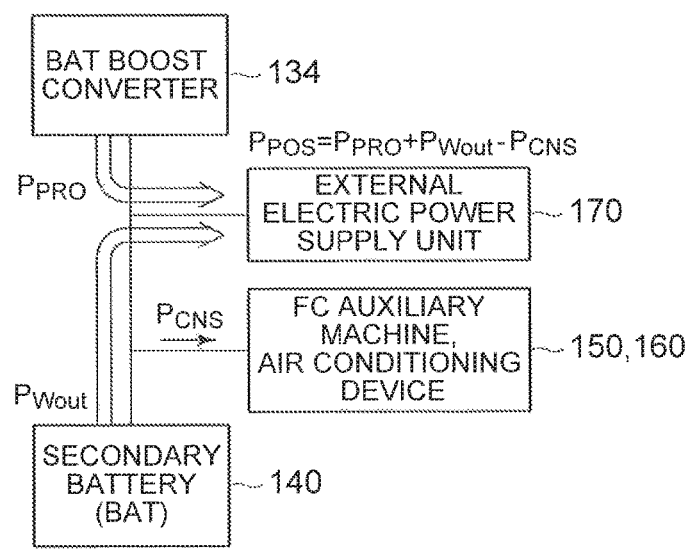
FIG. 3 is a diagram for showing details of suppliable electric power $P_{POS}$.

FIG. 3 is a diagram for showing details of the suppliable electric power $P_{POS}$. The control device 180 calculates the suppliable electric power $P_{POS}$ by the following Equation (3).

$$P_{POS} = P_{PRO} + P_{Wout} - P_{CNS} \quad (3)$$

Herein, $P_{PRO}$ is electric power that can pass through the BAT boost converter 134 (BDC-passing allowed upper limit electric power). $P_{CNS}$ is the total value of the electric power that is consumed by the FC auxiliary machine 150 and the air conditioning device 160. The BDC-passing allowed upper limit electric power $P_{PRO}$, which is a regulating value that is used to inhibit component damage attributable to the passage of a large amount of electric power through components such as the BAT boost converter 134, can be calculated based on a map showing a correspondence relationship of $P_{PRO}$ to a primary-side voltage and a secondary-side voltage of the BAT boost converter 134. $P_{CNS}$ can be calculated as, for example, the sum of the electric power required for the auxiliary machine $P_{CRQ}$ and the electric power required for air conditioning $P_{ARQ}$. As illustrated in FIG. 3, the suppliable electric power $P_{POS}$ is the electric power that is obtained by subtracting the electric power consumed by the FC auxiliary machine 150 and the air conditioning device 160 ($P_{CNS}$) from the total of the electric power supplied from the BAT boost converter 134 and the secondary battery 140 ($P_{PRO} + P_{Wout}$). The Suppliable Electric Power $P_{POS}$ corresponds to the electric power that is supplied to the external electric power supply unit 170.

Referring back to FIG. 2, the control device 180 calculates the supply allowed electric power $P_{ALW}$ by the following Equation (4) (Step S130) in a case where the fuel cell 110 is in the normal electric power generation mode.

$$P_{ALW} = \min\{P_{Win}, P_{Wout}, P_{POS}, P_{LIM}\} \quad (4)$$

Equation (4) corresponds to Equation (2) to which $P_{LIM}$ is added. $P_{LIM}$, which is the upper limit value (output limit value) of the electric power that is generated by the fuel cell 110 at present, can be calculated from various parameters showing the present state of the fuel cell 110. Examples of the parameters showing the present state of the fuel cell 110 include the temperature of the fuel cell 110, the amount of outside air which the ACP 138 takes in, the amount of remaining hydrogen in a hydrogen tank that stores the hydrogen which is supplied to the fuel cell 110, and the anode pressure and the cathode pressure of the fuel cell 110. The supply allowed electric power $P_{ALW}$ is calculated from Steps S110 to S130 described above.

Figure 4:
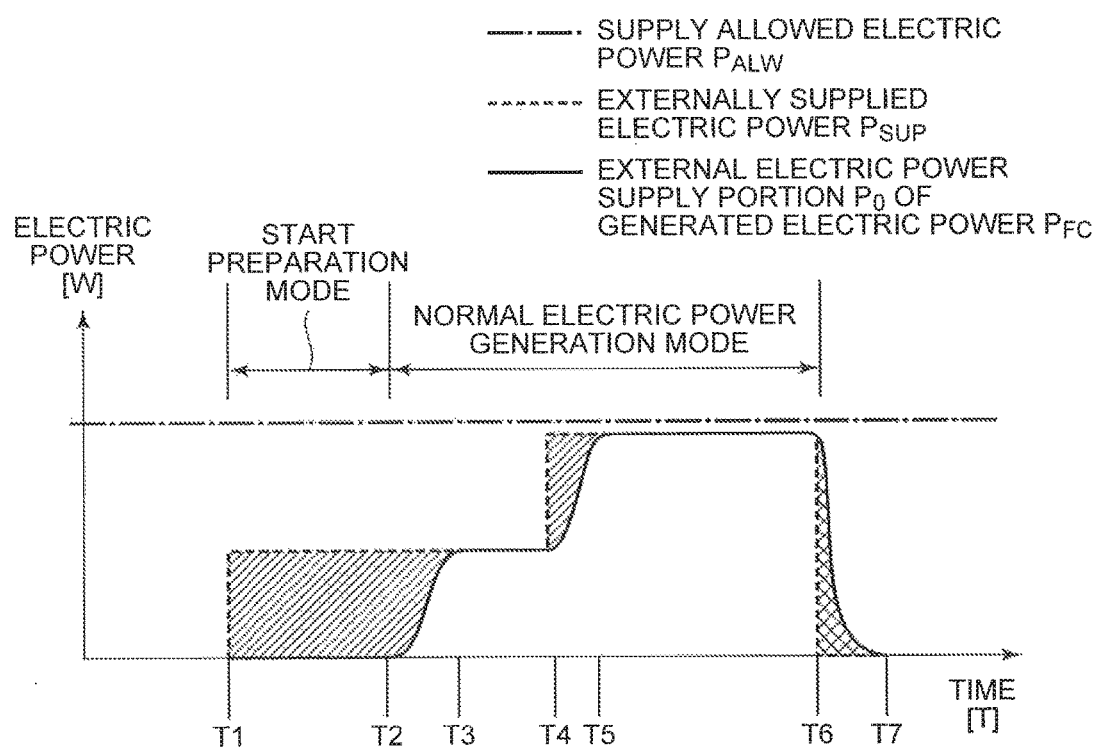
FIG. 4 is a diagram for showing an example of effects of an embodiment.

FIG. 4 is a diagram for showing an example of effects of this embodiment. FIG. 4 shows time-series variations of the supply allowed electric power $P_{ALW}$, the externally supplied electric power $P_{SUP}$, and an external electric power supply portion $P_0$ of the generated electric power $P_{FC}$. According to the following description, the fuel cell 110 is in the "start preparation mode" in the period of T1 to T2 and is in the "normal electric power generation mode" in the period of T2 to T6. The hatched part in FIG. 4 represents the electric power discharged (output) from the secondary battery 140 and the cross-hatched part in FIG. 4 represents the electric power which the secondary battery 140 is charged with (input to the secondary battery 140).

In the start preparation mode, the control device 180 performs control for the electric power discharged from the secondary battery 140 to bear the entire externally supplied electric power $P_{SUP}$ that is required. The externally supplied electric power $P_{SUP}$ according to this embodiment is equal to or less than the supply allowed electric power $P_{ALW}$, and thus the externally supplied electric power $P_{SUP}$ is equal to or less than the upper limit value $P_{Wout}$ of the electric power discharged from the secondary battery 140. Accordingly, the value of the electric power discharged from the secondary battery 140 can be raised to the value of the externally supplied electric power $P_{SUP}$ that is required. Then, it is possible to inhibit the actual externally supplied electric power $P_{SUP}$ from lowering with the externally supplied electric power $P_{SUP}$ that is required exceeding the upper limit value $P_{Wout}$ and the value of the electric power discharged from the secondary battery 140 not capable of rising to the value of the externally supplied electric power $P_{SUP}$ that is required. Accordingly, external electric power supply can be stably performed. In addition, the externally supplied electric power $P_{SUP}$ according to the embodiment is equal to or less than the supply allowed electric power $P_{ALW}$, and thus the externally supplied electric power $P_{SUP}$ is equal to or less than the suppliable electric power $P_{POS}$ that is set in order to protect components such as the BAT boost converter 134. Accordingly, damage to the components such as the BAT boost converter 134 that is attributable to the passage of the externally supplied electric power $P_{SUP}$ can be inhibited.

The control device 180 calculates the generated electric power $P_{FC}$ generated by the fuel cell 110, which corresponds to the required generated electric power $P_{FCR}$, by the following Equation (5).

$$P_{FC}=P_o+P_c+P_A+P_{CHG} \quad (5)$$

Herein, $P_o$ is the external electric power supply portion described above and corresponds to the externally required electric power $P_{ORQ}$. $P_c$ is the electric power that is supplied to the ACP 138 and the FC auxiliary machine 150 (electric power consumed by the auxiliary machine) and corresponds to the electric power required for the auxiliary machine $P_{CRQ}$. $P_A$ is the electric power that is supplied to the air conditioning device 160 (electric power consumed for air conditioning) and corresponds to the electric power required for air conditioning $P_{ARQ}$. $P_{CHG}$ is the electric power that is supplied to the secondary battery 140 (charging electric power) and corresponds to the SOC-correcting electric power $P_{SOC}$.

In the normal electric power generation mode, the control device 180 performs control for the generated electric power $P_{FC}$ generated by the fuel cell 110 to bear the entire externally supplied electric power $P_{SUP}$ that is required. However, the generated electric power $P_{FC}$ falls behind the required generated electric power $P_{FCR}$ due to a delayed reaction of the ACP 138 attributable to inertia or the like, and thus the external electric power supply portion $P_0$ of the generated electric power $P_{FC}$ falls behind the externally supplied electric power $P_{SUP}$ that is required (externally required electric power $P_{ORQ}$). Accordingly, the external electric power supply portion $P_0$ of the generated electric power $P_{FC}$ does not reach the externally supplied electric power $P_{SUP}$ that is required in the period of T2 to T3 when, for example, the drive mode is switched from the "start preparation mode" to the "normal electric power generation mode" at the time point of T2. In addition, the external electric power supply portion $P_0$ of the generated electric power $P_{FC}$ does not reach the externally supplied electric power $P_{SUP}$ that is required in the period of T4 to T5 when the externally supplied electric power $P_{SUP}$ that is required rapidly increases at the time point of T4. In the period of T2 to T3 and the period of T4 to T5, the electric power shortfall is compensated for by the electric power discharged from the secondary battery 140. Since the externally supplied electric power $P_{SUP}$ according to this embodiment is equal to or less than the supply allowed electric power $P_{ALW}$, the difference (shortfall) between the externally supplied electric power $P_{SUP}$ that is required and the external electric power supply portion $P_0$ of the generated electric power $P_{FC}$ is equal to or less than the upper limit value $P_{Wout}$ of the electric power discharged from the secondary battery 140. Accordingly, the value of the electric power discharged from the secondary battery 140 can be raised to the electric power value of the shortfall. Then, it is possible to inhibit the actual externally supplied electric power $P_{SUP}$ from lowering with the electric power value of the shortfall exceeding the upper limit value $P_{Wout}$ and the value of the electric power discharged from the secondary battery 140 not capable of rising to the voltage value of the shortfall.

The external electric power supply portion $P_0$ of the generated electric power $P_{FC}$ exceeds the externally supplied electric power $P_{SUP}$ that is required in the period of T6 to T7 when, for example, the required generated electric power $P_{FCR}$ that is required rapidly decreases and reaches zero at the time point of T6. In this period, the secondary battery 140 is charged with the surplus electric power. Since the externally supplied electric power $P_{SUP}$ according to this embodiment is equal to or less than the supply allowed electric power $P_{ALW}$, the difference (surplus) between the external electric power supply portion $P_0$ of the generated electric power $P_{FC}$ and the externally supplied electric power $P_{SUP}$ that is required is equal to or less than the charge allowed electric power $P_{Win}$ of the electric power which the secondary battery 140 is charged with. Accordingly, the value of the electric power which the secondary battery 140 is charged with can be raised to the surplus electric power value. Then, a fuel economy deterioration that is caused when the secondary battery 140 is not fully charged with the surplus electric power and the deterioration of and damage to the secondary battery 140 caused when the charge allowed electric power $P_{Win}$ is exceeded can be inhibited.

The externally supplied electric power $P_{SUP}$ according to this embodiment is equal to or less than the supply allowed electric power $P_{ALW}$, and thus the externally supplied electric power $P_{SUP}$ in the normal electric power generation mode is equal to or less than the output limit value $P_{LIM}$ of the electric power generated by the fuel cell 110. Accordingly, the value of generated electric power $P_{FC}$ generated by the fuel cell 110 can be raised to the value of the externally supplied electric power $P_{SUP}$ that is required. Then, it is possible to inhibit the electric power storage amount (SOC) of the secondary battery 140 from lowering with the value of the generated electric power $P_{FC}$ not capable of being raised to the value of the externally supplied electric power $P_{SUP}$ that is required due to an output limit of the fuel cell 110 and the output electric power supplied from the secondary battery 140. In addition, it is possible to inhibit a reduction in the output electric power and a reduction in the actual externally supplied electric power $P_{SUP}$ attributable to a reduction in the electric power storage amount (SOC) of the secondary battery 140. In addition, damage to components such as the BAT boost converter 134 can be inhibited as described above since the externally supplied electric power $P_{SUP}$ according to this embodiment is equal to or less than the supply allowed electric power $P_{ALW}$.

According to the fuel cell vehicle 10 of this embodiment described above, the value of the externally supplied electric power $P_{SUP}$ is regulated by the supply allowed electric power $P_{ALW}$, and thus the range of fluctuation of the externally supplied electric power $P_{SUP}$ can be absorbed by the charging and discharging of the secondary battery. Accordingly, the shortfall of the generated electric power can be sufficiently compensated for by the electric power discharged from the secondary battery 140 even when the externally supplied electric power $P_{SUP}$ that is required rapidly increases. In addition, the secondary battery 140 can be sufficiently charged with the surplus of the generated electric power even when the externally supplied electric power $P_{SUP}$ that is required rapidly decreases. Accordingly, electric power supply to the external load 200 can be stable even when an increase or decrease in the electric power generated by the fuel cell 110 is delayed with respect to an increase or decrease in the externally supplied electric power $P_{SUP}$ that is required. In addition, according to this embodiment, the range of fluctuation of the externally supplied electric power $P_{SUP}$ in the "normal electric power generation mode" can be the allowed output range of the fuel cell 110 since the value of the externally supplied electric power $P_{SUP}$ is regulated by the supply allowed electric power $P_{ALW}$. Accordingly, it is possible to inhibit the electric power storage amount (SOC) from lowering by inhibiting the output from the secondary battery 140 in, for example, a normal state. In addition, a reduction in the actual externally supplied electric power $P_{SUP}$ attributable to a reduction in the output from the secondary battery 140 can be inhibited.

B. Modification Example

The invention is not limited to the embodiment described above and can be implemented in various forms without departing from the spirit of the invention. For example, the following modifications are acceptable.

B-1. First Modification Example

According to this embodiment, Equation (2) and Equation (4) that are used in calculating the supply allowed electric power $P_{ALW}$ include the suppliable electric power $P_{POS}$. However, the suppliable electric power $P_{POS}$ may not be included in Equation (2) and Equation (4). In addition, the output limit value $P_{LIM}$ may not be included in Equation (4). Even in such cases, the range of fluctuation of the externally supplied electric power $P_{SUP}$ can be absorbed by the charging and discharging of the secondary battery. Accordingly, the shortfall of the generated electric power can be sufficiently compensated for by the electric power discharged from the secondary battery 140 even when the externally supplied electric power $P_{SUP}$ that is required rapidly increases. In addition, the secondary battery 140 can be sufficiently charged with the surplus of the generated electric power even when the externally supplied electric power $P_{SUP}$ rapidly decreases.

B-2. Second Modification Example

According to this embodiment, the control device 180 controls the external electric power supply unit 170 for the externally supplied electric power $P_{SUP}$ not to exceed the supply allowed electric power $P_{ALW}$. However, the control device 180 may not control the external electric power supply unit 170 for the externally supplied electric power $P_{SUP}$ not to exceed the supply allowed electric power $P_{ALW}$.

Even in this case, the externally required electric power $P_{ORQ}$ that is included in the generation required electric power $P_{FCRQ}$ by the fuel cell 110 is equal to or less than the supply allowed electric power $P_{ALW}$, and thus the control device 180 can control the electric power generation of the fuel cell 110 so that the externally supplied electric power $P_{SUP}$ is equal to or less than the supply allowed electric power $P_{ALW}$.

What is claimed is:

1. A method for controlling an external electric power supply system supplying electric power from a fuel cell and a secondary battery mounted on a vehicle to an external load, the method comprising:
   controlling electric power generation of the fuel cell and charging and discharging of the secondary battery such that externally supplied electric power, as electric power supplied to the external load from the fuel cell and the secondary battery, is equal to or less than supply allowed electric power; and
   setting a value of the supply allowed electric power to be equal to or less than a smaller one of an upper limit value of electric power with which the secondary battery is charged, the upper limit value of electric power with which the secondary battery is charged being set in accordance with a temperature and an electric power storage amount of the secondary battery, and an upper limit value of electric power discharged from the secondary battery, the upper limit value of electric power discharged from the secondary battery being set in accordance with the temperature and the electric power storage amount of the secondary battery.

2. The method according to claim 1, wherein the value of the supply allowed electric power is set to be equal to or less than a smallest one of the upper limit value of the electric power with which the secondary battery is charged, the upper limit value of the electric power discharged from the secondary battery, and an output limit value of electric power generated by the fuel cell when the fuel cell is in a state where the fuel cell is capable of supplying the generated electric power to the external load.

3. The method according to claim 1, wherein the value of the supply allowed electric power is set to be equal to or less than a smallest one of the upper limit value of the electric power with which the secondary battery is charged, the upper limit value of the electric power discharged from the secondary battery, and an upper limit value of the supply allowed electric power at which a magnitude of electric power passing through an electric power conversion unit converting electric power generated by the fuel cell into the externally supplied electric power is equal to or less than an upper limit value set such that the electric power conversion unit is protected.

4. The method according to claim 2, wherein the value of the supply allowed electric power is set to be equal to or less than a smallest one of the upper limit value of the electric power with which the secondary battery is charged, the upper limit value of the electric power discharged from the secondary battery, the output limit value of the electric power generated by the fuel cell, and an upper limit value of the supply allowed electric power at which a magnitude of electric power passing through an electric power conversion unit converting the electric power generated by the fuel cell into the externally supplied electric power is equal to or less than an upper limit value set such that the electric power conversion unit is protected when the fuel cell is in a state where the fuel cell is capable of supplying the generated electric power to the external load.

5. An external electric power supply system supplying electric power from a fuel cell and a secondary battery mounted on a vehicle to an external load, the external electric power supply system comprising a control device controlling electric power generation of the fuel cell and charging and discharging of the secondary battery such that externally supplied electric power as electric power supplied to the external load from the fuel cell and the secondary battery is equal to or less than supply allowed electric power,
   wherein the control device is programmed to set a value of the supply allowed electric power to be equal to or less than a smaller one of an upper limit value of electric power with which the secondary battery is charged, the upper limit value of electric power with which the secondary battery is charged being set in accordance with a temperature and an electric power storage amount of the secondary battery, and an upper limit value of electric power discharged from the secondary battery, the upper limit value of electric power discharged from the secondary battery being set in accordance with the temperature and the electric power storage amount of the secondary battery.

* * * * *